United States Patent
Dimitrova et al.

(10) Patent No.: US 12,091,546 B2
(45) Date of Patent: Sep. 17, 2024

(54) CONDENSATION CURABLE COMPOSITIONS

(71) Applicant: DOW SILICONES CORPORATION, Midland, MI (US)

(72) Inventors: Tatiana Dimitrova, Seneffe (BE); Anne-Marie Van Stiphoudt, Seneffe (BE)

(73) Assignee: Dow Silicones Corporation, Midland, MI (US)

( * ) Notice: Subject to any disclaimer, the term of this patent is extended or adjusted under 35 U.S.C. 154(b) by 1024 days.

(21) Appl. No.: 17/043,190

(22) PCT Filed: Mar. 15, 2019

(86) PCT No.: PCT/US2019/022410
§ 371 (c)(1),
(2) Date: Sep. 29, 2020

(87) PCT Pub. No.: WO2019/190775
PCT Pub. Date: Oct. 3, 2019

(65) Prior Publication Data
US 2021/0147682 A1    May 20, 2021

(30) Foreign Application Priority Data

Mar. 30, 2018    (GB) ..................... 1805383

(51) Int. Cl.
*C08L 83/04*        (2006.01)
*C09J 183/04*       (2006.01)

(52) U.S. Cl.
CPC ............. *C08L 83/04* (2013.01); *C09J 183/04* (2013.01); *C08K 2201/006* (2013.01)

(58) Field of Classification Search
CPC ... C08L 83/04; C09J 183/04; C08K 2201/006
See application file for complete search history.

(56) References Cited

U.S. PATENT DOCUMENTS

| | | | |
|---|---|---|---|
| 4,410,677 A | 10/1983 | Lampe | |
| 4,797,446 A * | 1/1989 | Dietlein | C08L 83/04 |
| | | | 528/901 |
| 6,063,487 A | 5/2000 | Azechi et al. | |
| 7,501,183 B2 | 3/2009 | Hara et al. | |
| 7,704,607 B2 | 4/2010 | Hara et al. | |
| 2010/0099793 A1 | 4/2010 | Wunder | |
| 2012/0192947 A1 | 8/2012 | Rasal et al. | |
| 2014/0087082 A1 | 3/2014 | Altum et al. | |
| 2015/0072079 A1 | 3/2015 | Bourbigot et al. | |
| 2015/0353774 A1 | 12/2015 | Simon et al. | |
| 2016/0326415 A1 | 11/2016 | Jadot et al. | |
| 2017/0372815 A1 | 12/2017 | Grau et al. | |

FOREIGN PATENT DOCUMENTS

| | | | |
|---|---|---|---|
| CN | 102516927 A | 6/2012 | |
| CN | 103562319 A | 2/2014 | |
| CN | 104245868 A | 12/2014 | |
| CN | 106414610 A | 2/2017 | |
| EP | 0802233 B1 | 2/2004 | |
| EP | 2106418 A1 | 10/2009 | |
| EP | 0893823 B1 | 5/2012 | |
| EP | 2489069 A1 | 8/2012 | |
| EP | 2952544 A1 | 12/2015 | |
| EP | 3192839 A1 * | 7/2017 | ............... C08K 9/06 |
| JP | 2010248384 A * | 11/2010 | |
| JP | 4903008 B2 | 3/2012 | |
| JP | 5776650 B2 | 9/2015 | |
| WO | 2007037552 A2 | 4/2007 | |
| WO | 2011047194 A1 | 4/2011 | |
| WO | 2013150121 A1 | 10/2013 | |
| WO | 20190190776 A1 | 10/2019 | |

OTHER PUBLICATIONS

Machine translation of JP-2010248384-A from WIPO Patentscope (Year: 2012).*
N. J. Mills, "The Rheological Properties And Molecular Weight Distribution Of Polydimethisiloxane", European Polymer Journal, 1969, p. 675-695, vol. 5.
Momentive RTV157 and RTV159 Technical Data Sheet, Sep. 17, 2020, 7 pages.
Machine assisted English translation of JP4903008B2 obtained from https://patents.google.com/patent on Jan. 11, 2021, 12 pages.
Machine assisted English translation of JP5776650B2 obtained from https://patents.google.com/patent on Jan. 11, 2021, 9 pages.
International Search Report for PCT/US2019/022410 dated May 29, 2019, 5 pages.

(Continued)

*Primary Examiner* — Kregg T Brooks
*Assistant Examiner* — David R. Foss
(74) *Attorney, Agent, or Firm* — Warner Norcross + Judd LLP

(57) ABSTRACT

A condensation cure organosiloxane composition is disclosed. The composition may be used as an electrically insulating sealant and/or adhesive. The composition is a silicone elastomer composition comprising: (a) a polydiorganosiloxane having at least two —OH or hydrolysable groups per molecule; (b) a cross-linker which will cross-link polydiorganosiloxane (a); (c) a filler component comprising (i) a maximum of 25% by weight of the composition of calcium carbonate and/or silica, and (ii) an amount of one or more fibrous fillers selected from mineral fibers, bulk fibers, refractory fibers, basalt fibers, or mixtures thereof; (d) a condensation curing catalyst; and optionally (e) one or more additives. Upon cure, the composition provides a silicone elastomer having a volume resistivity which is $\geq 2\times 10^{15}$ $\Omega \cdot$cm.

14 Claims, No Drawings

(56) References Cited

OTHER PUBLICATIONS

Xuefang Song et al., "Mechanical properties of styrene-butadiene-styrene block copolymer composites filled with calcium carbonate treated by liquid polybutadienes", Journal of Applied Polymer Science, vol. 113, No. 6, Sep. 15, 2009, pp. 3661-3670.
Database WPI, Week 201341, Thomson Scientific, London, GB; AN 2012-K08208, XP002791500.
Machine assisted English translation of CN102516927A obtained from https://patents.google.com/patent on Sep. 28, 2020, 9 pages.

* cited by examiner

CONDENSATION CURABLE COMPOSITIONS

CROSS-REFERENCE TO RELATED APPLICATIONS

This application is the National Stage of International Appl. No. PCT/US2019/022410 filed on 15 Mar. 2019, which claims priority to and all advantages of Great Britain Appl. No. 1805383.5 filed on 30 Mar. 2018, the content of which is hereby incorporated by reference.

TECHNICAL FIELD

This disclosure concerns a condensation cure organosiloxane composition that may be used as an electrically insulating sealant and/or adhesive.

BACKGROUND

Condensation curable organosiloxane compositions, which cure to elastomeric solids, are well known. Typically, such compositions are obtained by mixing a polydiorganosiloxane having reactive terminal groups, e.g. hydroxy groups or hydrolysable groups, with e.g. a silane cross-linking agent which is reactive with the polydiorganosiloxane, for example an acetoxy silane, an oximosilane, an aminosilane or an alkoxysilane in the presence of a suitable catalyst. Such compositions typically contain reinforcing fillers such as silica and/or calcium carbonate to enhance their physical properties.

These compositions can be commercialized as one-part or two-part compositions. The former (one-part compositions) cure in contact with atmospheric moisture. The latter (two-part compositions) are formulated typically in such a way that the catalyst and the cross linkers are kept as a "curing agent" separately, from the polydiorganosiloxane polymer having reactive terminal groups and filler (e.g. $CaCO_3$).

For the purposes of the current invention the term "curing agent" shall be used to denote the part containing the catalyst, the cross-linker and optionally other ingredients, but excluding the polydiorganosiloxane having reactive terminal groups.

Sealants, encapsulants and adhesives are increasingly being used to replace mechanical fixtures and the like in a wide variety of situations and applications often allowing for cheaper and faster production processes in the manufacture of articles. Increasingly at least some of the parts of such articles contain electrical circuitry resulting in the need for suitable sealants to adhere and/or seal-assembled parts of such articles as well as to function as insulators. Typical examples where it would be beneficial to use an electrically insulating silicone sealant or adhesive include, but are not limited to, sealants and adhesives in photovoltaic applications where they are required to develop permanent seals and/or adhesion between parts and adjacent materials and/or parts such as glass, metal and plastic substrates. Moreover, the insulative character of the material must be preserved over time, e.g. after extensive weathering. A wide variety of sealant/adhesive compositions have been proposed and silicone-based materials are some of the most favoured. Hydrosilylation cure silicone compositions are not generally preferred because they are poor adherents, whilst condensation cure systems can be problematic because they are in some instances not sufficiently good insulators.

SUMMARY

The inventors have surprisingly discovered silicone compositions which upon cure provide a good balance between their mechanical properties and inherent volume resistivity. "Volume resistivity", (ohms·cm ($\Omega$·cm)) is the measurement of the "bulk" resistivity of a material i.e. it discloses the inherent resistance of a tested specimen regardless of its shape or size. In other words, volume resistivity is the resistance to leakage current through the body of an insulating material. Surface resistivity is the resistance to leakage current along the surface of an insulating material. Hence, the higher the surface and/or volume resistivity, the lower the leakage current and the less conductive the material.

There is provided a silicone elastomer composition comprising:
a) a polydiorganosiloxane having at least two —OH or hydrolysable groups per molecule
b) a cross-linker which will cross-link polydiorganosiloxane (a);
c) a filler component comprising
  (i) a maximum of 25% by weight of the composition of calcium carbonate and/or silica and
  (ii) an amount of one or more fibrous fillers selected from mineral fibers, bulk fibers, refractory fibers, basalt fibers or mixtures thereof
d) a condensation curing catalyst and optionally
e) one or more additives,
which upon cure provides a silicone elastomer having a volume resistivity which is $\geq 2\times10^{15}$ $\Omega$·cm using the test method described herein.

There is provided a silicone elastomer, obtained by curing a composition comprising:
a) a polydiorganosiloxane having at least two —OH or hydrolysable groups per molecule
b) a cross-linker which will cross-link polydiorganosiloxane (a);
c) a filler component comprising
  (i) a maximum of 25% by weight of the composition of calcium carbonate and/or silica and
  (ii) an amount of one or more fibrous fillers selected from mineral fibers, bulk fibers, refractory fibers, basalt fibers or mixtures thereof
d) a condensation curing catalyst and optionally
e) one or more additives,
said silicone elastomer having a volume resistivity which is $\geq 2\times10^{15}$ $\Omega$·cm using the test method described herein.

DETAILED DESCRIPTION

The polydiorganosiloxane having at least two —OH or hydrolysable groups per molecule (a) may be depicted by the following Formula (1):

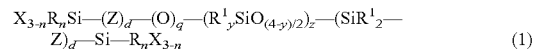

$$X_{3-n}R_nSi-(Z)_d-(O)_q-(R^1{}_ySiO_{(4-y)/2})_z-(SiR^1{}_2-Z)_d-Si-R_nX_{3-n} \qquad (1)$$

Wherein d is 0 or 1, q is 0 or 1 and d+q=1; n is 0, 1, 2 or 3, z is an integer from 200 to 5000 inclusive, y is 0, 1 or 2, alternatively is 2. At least 97% of the $R^1{}_ySiO_{(4-y)/2}$ are characterized with y=2. X is a hydroxyl group or alkoxy group or any condensable or any hydrolyzable group, R is individually selected from the group consisting of aliphatic groups such as alkyl, substituted alkyl, e g aminoalkyl, polyaminoalkyl, epoxyalkyl, and alkenyl groups or aromatic aryl groups and R' is individually selected from the group consisting of X, aliphatic alkyl groups, aliphatic alkenyl groups and aromatic groups.

The polydiorganosiloxane (a) can be a single siloxane represented by Formula (1) or it can be mixtures of siloxanes represented by the aforesaid formula or solvent/polymer mixtures. The term "polymer mixture" is meant to include any of these types of polymers or mixtures of polymers.

Each X group may be the same or different and can be a hydroxyl group and any condensable or hydrolyzable group. The term "hydrolyzable group" means any group attached to the silicon which is hydrolyzed by water at room temperature. The hydrolyzable group X includes groups of the Formula —OT, where T is any hydrocarbon or halogenated hydrocarbon group, such as methyl, ethyl, isopropyl, octadecyl, allyl, hexenyl, cyclohexyl, phenyl, benzyl, beta-phenylethyl; any hydrocarbon ether radical, such as 2-methoxyethyl, 2-ethoxyisopropyl, 2-butoxyisobutyl, p-methoxyphenyl or —(CH$_2$CH$_2$O)$_2$CH$_3$; or any N,N-amino radical, such as dimethylamino, diethylamino, ethylmethylamino, diphenylamino or dicyclohexylamino.

The most preferred X groups of the invention are hydroxyl groups or alkoxy groups. Illustrative alkoxy groups are methoxy, ethoxy, propoxy, butoxy, isobutoxy, pentoxy, hexoxy and 2-ethylhexoxy; dialkoxy radicals, such as methoxymethoxy or ethoxymethoxy and alkoxyaryloxy, such as ethoxyphenoxy. The most preferred alkoxy groups are methoxy or ethoxy.

R is individually selected from the group consisting of aliphatic groups, such as alkyl groups, substituted alkyl groups e.g. aminoalkyl, polyaminoalkyl, epoxyalkyl, groups and alkenyl groups and aromatic aryl groups. Most preferred are the methyl, ethyl, octyl, vinyl, allyl and phenyl groups.

$R^1$ is individually selected from the group consisting of X groups or aliphatic alkyl groups, aliphatic alkenyl groups and aromatic groups as described above. Alternatively, $R^1$ groups are selected from methyl, ethyl, octyl, trifluoropropyl, vinyl and phenyl groups. It is possible that some $R^1$ groups may be siloxane branches off the polymer backbone which may have terminal groups as hereinbefore described.

Z is independently a saturated, bi-valent aliphatic radical of the type of $C_wH_{2w}$ where w is 2 or more, alternatively w is from 2 to 10.

Polydiorganosiloxane (a) according to examples of the disclosure may be present in the form of a single polymer, or as a blend of polydiorganosiloxanes (a) having different degrees of values of z in formula (1) above.

The Degree of Polymerization (DP) in a macromolecule or polymer or oligomer molecule of silicone, in this case polydiorganosiloxane (a) is usually defined as the number of monomeric units therein. Synthetic polymers invariably consist of a mixture of macromolecular species with different degrees of polymerization and therefore of different molecular weights. There are different types of average polymer molecular weight, which can be measured in different experiments. The two most important are the number average molecular weight ($M_n$) and the weight average molecular weight (Mw). The $M_n$ and Mw values of silicone can be determined by Gel permeation chromatography (GPC) with precision of about 10-15%. This technique is standard and yields Mw (weight average molecular weight), Mn (number average molecular weight) and the polydispersity index (PI). DP=Mn/Mu where Mn is the number-average molecular weight coming from the GPC measurement and Mu is the molecular weight of a monomer unit. PI=Mw/Mn. The higher the DP, the higher the viscosity. The mathematical relationship of DP to the viscosity of the polymer via Mw, is understood to be typically: Log(Viscosity)=3.70 log(Mw)−16.3 for Mw values between 13000 and 70000. (Mills, E., European Polymer Journal, 1969, 675-695, see specifically pages 682 and 683, FIG. 4 and equation 14.).

For the avoidance of doubt, polydiorganosiloxane (a) may also be referred to as a siloxane polymer and/or as a silicone polymer. Polydiorganosiloxane (a) may be present in an amount of from 45 to 75% by weight of the composition, alternatively from 50 to 65% by weight of the composition.

Any suitable cross-linker (b) may be used. The cross-linker (b) is one or more silanes or siloxanes which contain silicon bonded hydrolysable groups such as acyloxy groups (for example, acetoxy, octanoyloxy, and benzoyloxy groups); ketoximino groups (for example dimethyl ketoximo, and isobutylketoximino); alkoxy groups (for example methoxy, ethoxy, iso-butoxy and propoxy) and alkenyloxy groups (for example isopropenyloxy and 1-ethyl-2-methylvinyloxy).

In the case of siloxane-based cross-linkers the molecular structure can be straight chained, branched, or cyclic.

The cross-linker preferably has at least three or four hydroxyl and/or hydrolysable groups per molecule which are reactive with the hydroxyl and/or hydrolysable groups in organopolysiloxane (a). When the cross-linker is a silane and when the silane has a total of three silicon-bonded hydroxyl and/or hydrolysable groups per molecule, the fourth group is suitably a non-hydrolysable silicon-bonded organic group. These silicon-bonded organic groups are suitably hydrocarbyl groups which are optionally substituted by halogen such as fluorine and chlorine. Examples of such fourth groups include alkyl groups (for example methyl, ethyl, propyl, and butyl); cycloalkyl groups (for example cyclopentyl and cyclohexyl); alkenyl groups (for example vinyl and allyl); aryl groups (for example phenyl, and tolyl); aralkyl groups (for example 2-phenylethyl) and groups obtained by replacing all or part of the hydrogen in the preceding organic groups with halogen. Preferably however, the fourth silicon-bonded organic group is methyl.

Silanes and siloxanes which can be used as cross-linkers include alkyltrialkoxysilanes such as methyltrimethoxysilane (MTM) and methyltriethoxysilane, alkenyltrialkoxy silanes such as vinyltrimethoxysilane and vinyltriethoxysilane, isobutyltrimethoxysilane (iBTM). Other suitable silanes include ethyltrimethoxysilane, vinyltriethoxysilane, phenyltrimethoxysilane, alkoxytrioximosilane, alkenyltrioximosilane, 3,3,3-trifluoropropyltrimethoxysilane, methyltriacetoxysilane, vinyltriacetoxysilane, ethyl triacetoxysilane, di-butoxy diacetoxysilane, phenyl-tripropionoxysilane, methyltris(methylethylketoximo) silane, vinyl-tris-methylethylketoximo)silane, methyltris (methylethylketoximino)silane, methyltris(isopropenoxy) silane, vinyltris(isopropenoxy)silane, ethylpolysilicate, n-propylorthosilicate, ethylorthosilicate, dimethyltetraacetoxydisiloxane. The cross-linker used may also comprise any combination of two or more of the above.

Alternatively, cross-linker (b) may comprise a silyl functional molecule containing two or more silyl groups, each silyl group containing at least one —OH or hydrolysable group, the total of number of —OH groups and/or hydrolysable groups per cross-linker molecule being at least 3. Hence, a disilyl functional molecule comprises two silicon atoms each having at least one hydrolysable group, where the silicon atoms are separated by an organic or siloxane spacer. Typically, the silyl groups on the disilyl functional molecule may be terminal groups. The spacer may be a polymeric chain having a siloxane or organic polymeric backbone. In the case of such siloxane or organic based cross-linkers the molecular structure can be straight chained, branched, cyclic or macromolecular.

In the case of siloxane-based polymers the viscosity of the cross-linker will be within the range of from 0.5 mPa·s to 80,000 mPa·s at 25° C., alternatively 0.5 mPa·s to 25,000 mPa·s at 25° C., alternatively 0.5 mPa·s to 10,000 mPa·s at 25° C. measured using a Brookfield viscometer. Examples of disilyl polymeric cross-linkers with a silicone polymer chain bearing alkoxy functional end groups include polydimethylsiloxanes having at least one trialkoxy terminal where the alkoxy group may be a methoxy or ethoxy group. Examples might include hexamethoxydisiloxane, hexaethoxydisiloxane, hexa-n-propoxydisiloxane, hexa-n-butoxydisiloxane, octaethoxytrisiloxane, octa-n-butoxytrisiloxane and decaethoxy tetrasiloxane.

For example, cross-linker (b) may be a disilyl functional polymer, that is, a polymer containing two silyl groups, each having at least one hydrolysable group such as described by the formula

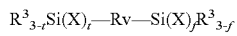

$$R^3_{3-t}Si(X)_t\text{—}Rv\text{—}Si(X)_fR^3_{3-f}$$

where each $R^3$ may be the same or different and is selected from aliphatic alkyl groups, aliphatic alkenyl groups and aromatic groups, alternatively $R^3$ is an alkyl group having from 1 to 6 carbons; X may be individually selected as hereinbefore described above and t and f are independently an integer of 1, 2 or 3, alternatively 2 or 3. Rv is an alkylene (divalent hydrocarbon radical), alternatively an alkylene group having from 1 to 10 carbon atoms, or further alternatively 1 to 6 carbon atoms or a combination of said divalent hydrocarbon radicals and divalent siloxane radicals. Preferred di-silyl functional polymer cross-linkers have t=2 or 3, X=OMe and Rv being an alkylene group with 4 to 6 carbons.

Examples of disilyl polymeric cross-linkers with an organic polymer chain bearing alkoxy functional end groups include 1, 6-bis(trimethoxy silyl)hexane.

The amount of cross-linker present in the composition will depend upon the particular nature of the cross-linker and in particular, the molecular weight of the molecule selected. The compositions suitably contain cross-linker in at least a stoichiometric amount as compared to organopolysiloxane (a) described above.

The filler component (c) comprises:
(i) a maximum of 25% by weight of the composition of calcium carbonate and/or silica, alternatively calcium carbonate and optionally silica; and
(ii) an amount of one or more fibrous fillers selected from mineral fibers, bulk fibers, refractory fibers, basalt fibers or mixtures thereof.

Fillers (c) (i) are effectively reinforcing fillers. The calcium carbonate present is a precipitated or ground calcium carbonate which, in each case, preferably has a BET specific surface area of >100 m²/g. Reinforcing silica, as defined for the purpose of this disclosure, is preferably fumed hydrophobic silica. Commercial examples are available, for example, from Evonik under the name of Aerosil® 972, Aerosil® 974 and Aerosil® 812. This list is not exhaustive. Increasing the amount of the reinforcing silica rapidly increases the thixotropic character and non-sag properties of the material. Industry Information-"Technical Bulletin Fine Particles 63" available form Evonik.com provides further examples and guidance on the use of silica.

Hence, the reinforcing filler(s) may for example be ground calcium carbonate and/or precipitated calcium carbonate having a BET specific surface area of >100 m²/g, and optionally fumed and/or precipitated silica, each of which has independently been treated by a treating agent such as, for example, stearic acid or a stearate. The surface treatment of filler component (c) (i) may be performed, for example with a fatty acid or a fatty acid ester such as a stearate, or with organosilanes, organosiloxanes, or organosilazanes e.g. hexaalkyl disilazane or short chain siloxane diols to render the filler(s) hydrophobic and therefore easier to handle and obtain a homogeneous mixture with the other ingredients of the composition. Typically surface modified fillers do not clump and can be homogeneously incorporated into the composition. This results in improved room temperature mechanical properties of the uncured compositions.

The addition of an "active" or reinforcing filler to improve an elastomer's mechanical properties, such as modulus, tensile strength or elongation at break, is known as reinforcement. The use of reinforcing fillers improves both the strength and stiffness characteristics of a cross-linked elastomer. A filled cross-linked elastomer has significantly higher stiffness than an unfilled cross-linked elastomer with the same degree of deformation. Furthermore, a filled cross-linked elastomer also has a considerably higher strength and deformation to break than an unfilled analogue.

The filler component (c) also comprises one or more fibrous fillers (c)(ii) selected from mineral fibrous fibers, bulk fibrous fibers, refractory fibrous fibers, basalt fibrous fibers or mixtures thereof. The fibrous fillers (c)(ii) may include fibers composed of one or more metal oxides e.g. alkali metal oxides, alkali-earths metal oxides, aluminium oxides and iron oxides and mixtures thereof. Non-exhaustive examples for fibrous fillers are commercial products obtained from Morgan Ceramics, available under the trade name Enfil® SH or RockForce®/Roxul grades available from Lapinus. Preferred fibers consist of predominantly $SiO_2$, transition metals oxides, oxides of the alkali and alkali-earths elements. The most preferred fibres are ceramic or refractive fibres with fibre lengths of 100-150 microns, and a CaO/MgO content of less than 30% by weight of the total weight of (c)(ii). Suitable commercial examples of the latter include, for the sake of example, Rockforce® MS603-Roxul® 1000, Rockforce® MS605-Roxul® 1000 and Rockforce® MS603-Roxul® 1000, Enfil® grade fibers from Morgan Ceramics and basalt fibers.

The filler component (c) may be present in an amount of from 10 to 50% by weight of the composition, alternatively from 20 to 50% by weight of the composition. As described above there may be a cumulative maximum of calcium carbonate and/or silica ((c) (i) of up to 25% by weight of the composition and the remainder of the reinforcing filler relied upon in the composition is of type (c) (ii) fibrous fillers. In one alternative there may be from about 5 to 15% by weight of calcium carbonate and/or silica i.e. type (c) (i) fillers and from 15 to 40% by weight, alternatively from 15 to 30% by weight of type (c) (ii) fibrous fillers. In another alternative the fillers may be solely (c) (ii) fibrous fillers.

As a further option the filler component may additionally include Non-reinforcing fillers including non-fibrous metal oxides e.g. alkali metal oxides, alkali-earths metal oxides, aluminium oxides and iron oxides and mixtures thereof. Non-reinforcing silica can be both fumed and/or precipitated silica particles with a BET specific surface area of ≤100 m²/g. Preferably, when utilized the silica is hydrophobically treated to facilitate the incorporation in the composition. Examples of commercially available hydrophobically non-reinforcing treated silicas include Aerosil® R9200, Sipernat® D10, Sipernat® D13 and Sipernat® D17.

Non-reinforcing fillers have the function to adjust the viscosity and processability of the composition in the uncured state, achieve specific colour of the final material etc.

It is commonly considered that materials with high specific surface area and which are highly dispersible in organopolysiloxane polymers will provide better reinforcement. The high specific surface area is usually determined by the nitrogen adsorption method based on Brunauer-Emmett-Teller theory or known in the art as the "BET method" and is typically between 100 and 400 m²/g. The ability of a filler to reinforce (or not is typically provided on the technical specification by the manufacturer. Alternatively, a simple curable composition might be prepared and the reinforcing quality of the filler can be understood by the determination of its post cure physical properties, e.g. tensile strength, elongation at break [%] and hardness. Details and sample formulations for testing are provided in "Technical Bulletin Fine Particles 63", available from EVONIK. For the purpose of this disclosure non-reinforcing fillers have a BET specific surface area of ≤100 m²/g) and reinforcing fillers have a BET specific surface area of >100 m²/g).

Condensation catalyst (d) may be any suitable tin based condensation catalyst. Examples include tin triflates, organic tin metal catalysts such as triethyltin tartrate, tin octoate, tin oleate, tin naphthenate butyltintri-2-ethylhexoate, tin butyrate, carbomethoxyphenyl tin trisuberate, isobutyltin-triceroate, and diorganotin salts especially diorganotin dicarboxylate compounds such as dibutyltin dilaurate, dimethyltin dibutyrate, dibutyltin dimethoxide, dibutyltin diacetate, dimethyltin bisneodecanoate, dibutyltin dibenzoate, stannous octoate, dimethyltin dineodecanoate (DMTDN) and dibutyltin dioctoate.

Optionally the composition may include one or more additional polydialkylsiloxanes (f) which may be unreactive with both polydiorganosiloxane (a) and cross-linker (b) and have the general formula:

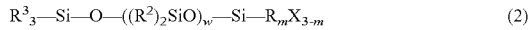

$$R^3{}_3—Si—O—((R^2)_2SiO)_w—Si—R_mX_{3-m} \quad (2)$$

R and $R^3$ are as hereinbefore described. Preferably in the case of additional polydialkylsiloxanes (f), R is an alkyl group, typically a methyl group and m=2 or 3. Each $R^3$ may be the same or different and can be the same as hereinbefore described however, preferably each $R^3$ is a methyl group and each $R^2$ group are, for example, methyl, vinyl or phenyl group. Such polydimethylsiloxanes (f) used generally have a viscosity of from about 5 to about 100,000 mPa·s at 25° C., alternatively from about 5 to about 75,000 mPa·s at 25° C., alternatively from about 5 to about 50,000 mPa·s at 25° C. and w is an integer which provides this viscosity range. Typically, polydialkylsiloxane (f) is linear but it may contain a degree of branching. The degree of polymerisation of polydiorganosiloxane (f) may be determined as described above. Typically, when present this polydiorganosiloxane (f) is utilised as a polymer in the curing agent of a two-part composition as described hereafter.

Other additives (g) may include but are not restricted to rheological modifiers; adhesion promoters, pigments, heat stabilizers, flame retardants, UV stabilizers, chain extenders, and fungicides and/or biocides and the like.

Rheology Modifiers

Rheology modifiers which may be incorporated in moisture curable compositions according to the invention include silicone organic co-polymers such as those described in EP0802233 based on polyols of polyethers or polyesters; non-ionic surfactants selected from the group consisting of polyethylene glycol, polypropylene glycol, ethoxylated castor oil, oleic acid ethoxylate, alkylphenol ethoxylates, copolymers or ethylene oxide and propylene oxide, and silicone polyether copolymers; as well as silicone glycols. For some systems these rheology modifiers, particularly copolymers of ethylene oxide and propylene oxide, and silicone polyether copolymers, may enhance the adhesion of the sealant to substrates, particularly plastic substrates.

Optional additives (g) may also include one or more adhesion promoters such as
  (i) carbasilatrane derivatives as described in WO2007/037552A2 such as a methoxy group-containing carbasilatrane such as constituent B-2 as described in paragraphs [0026] and [0027] of WO2007/037552A2 and/or adhesion promoter A as described in paragraph [0047] of WO2007/037552A2 incorporated herein by reference; or
  (ii) an aminoalkylmethoxysilane of the formula

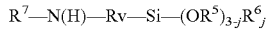

$$R^7—N(H)—Rv—Si—(OR^5)_{3-j}R^6{}_j$$

where $R^7$ is H or an amine radical of the type $NH_2—C_dH_{2d}—$; Rv is as hereinbefore described $R^5$ is $C_gH_{2g+1}$, $R^6$ is a hydrocarbon which can be unsaturated and has between 1 and 4 carbon atoms inclusive, and j is 0 or 1. Preferably d is between 1 and 6, Rv is $C_eH_{2e}$ with e being between 2 and 7 and g is from 1 to 3, preferably 3. Mixtures of the above adhesion promoters are also included.

In either case, when present the adhesion promoter may be distilled prior to use.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include titanium dioxide, chromium oxide, bismuth vanadium oxide, iron oxides and mixtures thereof.

Examples of heat stabilizers include metal compounds such as red iron oxide, yellow iron oxide, ferric hydroxide, cerium oxide, cerium hydroxide, lanthanum oxide, copper phthalocyanine. Aluminum hydroxide, fumed titanium dioxide, iron naphthenate, cerium naphthenate, cerium dimethylpolysilanolate and acetylacetone salts of a metal chosen from copper, zinc, aluminum, iron, cerium, zirconium, titanium and the like. The amount of heat stabilizer present in a composition may range from 0.01 to 1.0% weight of the total composition.

Biocides may additionally be utilized in the composition if required. It is intended that the term "biocides" includes bactericides, fungicides and algicides, and the like. Suitable examples of useful biocides, which may be utilized in compositions as described herein, include, for the sake of example:

Carbamates such as methyl-N-benzimidazol-2-ylcarbamate (carbendazim) and other suitable carbamates, 10,10'-oxybisphenoxarsine, 2-(4-thiazolyl)-benzimidazole, N-(fluorodichloromethylthio)phthalimide, diiodomethyl p-tolyl sulfone, if appropriate in combination with a UV stabilizer, such as 2,6-di(tert-butyl)-p-cresol, 3-iodo-2-propinyl butylcarbamate (IPBC), zinc 2-pyridinethiol 1-oxide, triazolyl compounds and isothiazolinones, such as 4,5-dichloro-2-(n-octyl)-4-isothiazolin-3-one (DCOIT), 2-(n-octyl)-4-isothiazolin-3-one (OIT) and n-butyl-1,2-benzisothiazolin-3-one (BBIT). Other biocides might include for example Zinc Pyridinethione, 1-(4-Chlorophenyl)-4,4-dimethyl-3-(1,2,4-triazol-1-ylmethyl)pentan-3-ol and/or 1-[[2-(2,4-dichlorophenyl)-4-propyl-1,3-dioxolan-2-yl]methyl]-1H-1,2,4-triazole.

When present in the composition, the fungicide and/or biocide may suitably be present in an amount up to 0.3% by weight of the composition and may be present in an encapsulated form where required such as described in EP2106418.

Dependent on the means of cure (e.g. cross-linker and catalyst) such compositions may be provided to the user in a one-part curable product, which can be applied onto a substrate directly or alternatively in a multi-part, typically two-part, combination requiring the multiple parts to be mixed together immediately before use. The composition as hereinbefore described may comprise a two-part composition comprising a base part and a curing agent.

When the composition is provided in two-parts or more, the properties of Individual parts of said multi-part compositions are generally not affected by atmospheric moisture, but once mixed together the resulting mixture possess excellent deep curability and enables substantially uniform curing throughout the entire body of the sealing material, i.e., from the surface to the inner part. The two-part compositions comprise a first component (base) that contains silanol-terminated diorganopolysiloxane (a), filler (c), i.e. (c) (i) and (c) (ii) and a second component (catalyst or cure package) containing an alkyl-terminated diorganopolysiloxane, tin based catalyst, cross-linker and if required, adhesion promoter as hereinbefore or described or, e.g. a primary aminosilane.

In the case of two-part compositions the base component comprises: siloxane polymer (a) in an amount of 50 to 90% by weight of the base composition, alternatively from 50 to 80% by weight of the base composition, (with a view to being a present in an amount of from 50 to 75% by weight of the total composition as hereinbefore described) and reinforcing fillers (c).

Reinforcing fillers (c) are present in an amount of from from 10 to 50% by weight of the composition, alternatively from 20 to 50% by weight of the composition wherein there may be a cumulative maximum of calcium carbonate and/or silica or calcium carbonate and optionally silica ((c) (i)) of up to 25% by weight of the composition and the remainder of the reinforcing filler relied upon in the composition is of type (c) (ii) fibrous fillers. Indeed, as previously mentioned the filler (c) may be solely comprised of type (c) (ii) fibrous fillers. In one alternative there may be from about 5 to 15% by weight of calcium carbonate and/or silica i.e. type (c) (i) fillers and from 15 to 40% by weight, alternatively from 15 to 30% by weight of type (c) (ii) fibrous fillers. In another alternative, component (c) of the base component may solely contain of type (c) (ii) fibrous fillers.

The non-reinforcing fillers may be present in the base composition in an amount of from 0% to 20% by weight of the base composition,
with the total weight % of the base component being 100 weight %.

The catalyst package may contain:
one or more polydialkylsiloxanes (f) which may be unreactive with both polydiorganopolysiloxane (a) and cross-linker (b) and has the general formula:

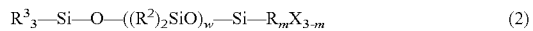

$$R^3{}_3\text{—Si—O—}((R^2)_2\text{SiO})_w\text{—Si—}R_m X_{3-m} \quad (2)$$

R and $R^3$ are as hereinbefore described and m is 0, 1, 2 or 3. Preferably in the case of additional polydialkylsiloxanes (f), R is an alkyl group, typically a methyl group and m=2 or 3. Each $R^3$ may be the same or different and can be the same as hereinbefore described however, preferably each $R^3$ is a methyl group and each $R^2$ group are, for example, methyl, vinyl or phenyl group, preferably each $R^2$ is a methyl group. Such polydimethylsiloxanes (f) used generally have a viscosity of from about 5 to about 100,000 mPa·s at 25° C., alternatively from about 5 to about 75,000 mPa·s at 25° C., alternatively from about 5 to about 50,000 mPa·s at 25° C. and w is an integer which provides this viscosity range. in an amount of from 0 to 80% by weight of the catalyst package; with the total weight % of the catalyst package being 100 weight %.

In the case of two-part sealant compositions, the components of each part are mixed together in amounts within the ranges given above and then the base component composition and the catalyst package composition are inter-mixed in a predetermined ratio e.g. from 15:1 to 1:1, alternatively from 14:1 to 5:1 alternatively from 14:1 to 7:1. If the intended mixing ratio of the base component:catalyst package is 15:1 or greater then no filler will be generally utilized in the catalyst package. However, if the intended mixing ratio of the base component:catalyst package is less than 15:1 an increasing amount filler will be utilized in the catalyst package up to the maximum of 50% weight of the catalyst package, if the intended ratio is 1:1. The moisture curable compositions can be prepared by mixing the ingredients employing any suitable mixing equipment.

The two parts of the composition as provided herein may be mixed in any suitable order. In one embodiment the base composition is prepared in the following way:

As previously mentioned the compositions as provided herein can be seen to provide a good balance between their mechanical properties and inherent "bulk" volume resistivity, i.e. the inherent resistance of a tested specimen regardless of its shape or size with the higher the surface resistivity and/or volume resistivity, the lower the leakage current and the less conductive the material. As previously discussed the composition herein upon cure provides a silicone elastomer having a volume resistivity which is $\geq 2\times10^{15}$ Ω·cm; alternatively is $\geq 5\times10^{15}$ Ω·cm. Not only does the composition provide such a good volume resistivity but it also is suitable for use as an adhesive.

Examples

Ingredients Used

Polydiorganosiloxane polymers (a) of different average degrees of polymerisation (DP) were utilised as depicted in the following Tables. They were generally polydimethylsiloxanes having dimethylhydroxy terminal groups unless otherwise indicated. The DPs of the polymers utilised are determined by Gel permeation chromatography (GPC) with precision of about 10-15%. As previously discussed, this technique is standard and yields Mw (weight average molecular weight), Mn (number average molecular weight) and polydispersity index (PI). PI=Mw/Mn values as previously discussed. The DP is linked to the viscosity of the polymer, the higher the DP, the higher the viscosity. Typically, the relationship between viscosity and Mw is Log (Viscosity)=3.70 log (Mw)−16.3 for Mw between 13000 and 70000.

The $CaCO_3$ (c) (i) used in the examples was surface treated with stearic acid. The mean particle size was 60-70 microns and BET surface area was 18-20 $m^2/g$ as per manufacturer's data.

Fibrous Fillers

The fibrous fillers (c) (ii) used in the following examples are commercial products Enfil® SH, Rockforce® MS603-Roxul® 1000, Rockforce® MS615-Roxul® 1000 and CoatForce® CF50. Enfil® SH was obtained from Morgan Ceramics, and the others were obtained from Lapinus Fibres BV. The composition and some properties of the fibers used as provided by their technical data sheets are summarized in the tables 1a-1c below. The fibers consisted of predominantly $SiO_2$, transition metals oxides, oxides of the alkali and alkali-earths elements.

TABLE 1a

The minimum weight % of mineral oxides present in different fibres

| fiber commercial name | Min % | | | | |
|---|---|---|---|---|---|
| | $SiO_2$ | $Al_2O_3$ | CaO + MgO | FeO | ZrO |
| Rockforce ® MS603-Roxul ® 1000 | 38 | 18 | 23 | 4.5 | — |
| Rockforce ® MS615-Roxul ® 1000 | 38 | 18 | 23 | 4.5 | — |
| CoatForce ® CF50 | 37 | 18 | 34 | 0 | — |
| . Enfil ® SH | unk | Tr | — | unk | unk |

Unk = unknown (i.e. not provided in data sheet by supplier)
Tr = Traces numerical details not provided on supplier datasheet TABLE 1b The maximum weight % of mineral oxides present in different fibres

| fiber commercial name | max % | | | | | | |
|---|---|---|---|---|---|---|---|
| | $SiO_2$ | $Al_2O_3$ | CaO + MgO | FeO | $K_2O$ + $Na_2O$ | ZrO | Other |
| Rockforce ® MS603-Roxul ® 1000 | 43 | 23 | 28 | 8 | 4.5 | | 6 |
| Rockforce ® MS615-Roxul ® 1000 | 43 | 23 | 28 | 8 | 4.5 | | 6 |
| CoatForce ® CF50 | 42 | 23 | 39 | 1 | 3 | | 3 |
| Enfil ® SH | 69 | Tr | | Tr | | 10 | q.s. 100 |

TABLE 1c

Physical Properties of Fibrous Fillers used in Examples

| fiber commercial name | moisture content (wt. %) | Length, (μm) | Shot, % | melting point (° C.) |
|---|---|---|---|---|
| Rockforce ® MS603-Roxul ® 1000 | 0.1 | 125 ± 25 | 1 | 1000 |
| Rockforce ® MS615-Roxul ® 1000 | 0.1 | 650 ± 150 | 1 | 1000 |
| CoatForce ® CF50 | 0.1 | 500 ± 50 | 0.6 | 700 |
| Enfil ® SH (assessment) | 0.1-0.3 | 100-150 | 1-2 | 1250 |

Non-reinforcing silica can be both fumed and precipitated. The inventors find it beneficial to use silica with hydrophobized surface to facilitate the incorporation in the matrix. Examples include (non-exhaustive list) Aerosil® R9200, Sipernat® D10, Sipernat® D13 and Sipernat® D17, all from Evonik Industries.

The adhesion promoter used in this example was a carbasilatrane derivative which was a condensation product of reactive silanes and was made following the description in paragraph [0047] of WO2007037552A2 (Adhesion promoter A) assigned to Dow Corning.

The tin based catalyst (d) was Dimethyl Tin Di Neodecanoate, DMTDN

The preceding ingredients are henceforth illustrated by the following Examples, in which compositions are provided in weight % (wt. %), unless otherwise indicated. Viscosities were measured using a Brookfield® cone plate viscometer (RV DIII) using cone plate CP-52 for viscosities of 40,000 mPa·s and below and cone plate CP-51 for materials having viscosities greater than 40,000 mPa·s adapting the speed according to the polymer viscosity.

The volume resistivity of a typical calcium carbonate filled two-part sealant formulation was used as a reference. The compositions of the base and curing agent parts are depicted below. The base part and curing agent part were mixed together in a ratio of 10:1 in a volume ratio of 10:1.

TABLE 2a

| INGREDIENTS (BASE) | % |
|---|---|
| Mixture of polydimethylsiloxanes having dimethylhydroxy and/or trimethyl terminal groups having a DP of 550 +/− 10% | 52.6 |
| Dimethylhydroxy terminated polydimethylsiloxane DP of 10 +/− 30% | 1.4 |
| Precipitated $CaCO_3$ | 40.0 |
| Ground $CaCO_3$ | 6.0 |

TABLE 2b

| INGREDIENTS (Curing agent) | % |
|---|---|
| methyltrimethoxysilane cross-linker | 4.2 |
| Trimethyl terminated polydimethylsiloxane having a viscosity of 60,000 mPa · s at 25° C. | 56.7 |
| Carbon black pigment | 13 |
| AEROSIL ® R974 treated silica | 0.90 |
| Dimethyl tin dineodecanoate (DMTDN) | 0.2 |
| Adhesion Promoter | 25.0 |

Sample preparation for Measurement of the volume resistivity:

Sheets of 2 mm thickness were prepared in the following manner: The Base and the curing agent were mixed at the appropriate ratio and placed between two teflonized foils. The foils were then pressed against each other using a using a hydraulic press (Agila) operated at room temperature of 23° C.+/−1° C. Thus obtained protected sheets were left to cure in controlled conditions (25° C. and 50% relative humidity) for 3 weeks. Then the foils were removed and a square piece were cut out of the cure sheets for the volume resistivity measurement.

For the purpose of the invention, the volume resistivity is measure upon the application of 500 V current for 5 minutes.

The experiments were conducted at room temperature of 21-23° C. and relative humidity of 50+/−10%. The reported values are average of 3 independent measurements.

Volume resistivity was determined using a 16008B Resistivity Cell supplied by Keysight Technologies in combination with a 4339B High Resistance Meter, DC from the same supplier. According to the equipment supplier this equipment is suitable for accurately measuring volume resistance values up to $1.6 \times 10^{16}$ Ω·cm.

The reference elastomeric material made from the two-part composition depicted in Tables 2a and 2b above gave a value of $1.3 \times 10^{15}$ which is less than $2.0 \times 10^{15}$ as required herein and therefore is not suitable for use in an electronic environment.

Inventive Formulations Examples

All compositions are mass parts. Therefore, the sum is not necessarily 100.

TABLE 3a

| Formulation: bases | | | | | | | |
|---|---|---|---|---|---|---|---|
| | Ex1 | Ex2 | Ex3 | Ex4 | Ex5 | Ex6 | Ex7 |
| Dimethyl hydroxyl terminated polydimethylsiloxane DP of 300 +/− 10% | 88.0% | 77.1% | 66.0% | 66.0% | 66.0% | 66.0% | 25.2% |
| Precipitated calcium carbonate | 5.5% | 4.8% | 4.1% | 4.1% | 4.1% | 4.1% | 0.0% |
| Sipernat D10 (Evonik) | 6.5% | 5.7% | 4.9% | 4.9% | 4.9% | 4.9% | 8.0% |
| Enfil ® SH (Morgan ceramics) | | 12.4% | 25.0% | | | | |
| Rockforce ® MS603-Roxul ® 1000 | | | | 25.0% | | | |
| Rockforce ® MS615-Roxul ® 1000 | | | | | 25.0% | | |
| CoatForce ® CF50 | | | | | | 25.0% | |
| Dimethyl hydroxyl terminated polydimethylsiloxane DP of 530 +/− 10% | | | | | | | 63.7% |
| Aerosil ® 974 | | | | | | | 3.2% |
| Volume Resistivity ($\times 10^{15}$ Ohm · cm) | 5.1 | 3.2 | 10 | 6.8 | 6.0 | 2.4 | 6.4 |

Preparation of the Base

It was determined that the following proved to be the most efficient order of addition for making the above base material as described:
Siloxane polymers;
filler treatment agents
fillers.

The base was prepared using a Hauschield mixer model DAC 400.1 FVZ, although alternatively planetary mixers could have been utilised.

TABLE 3b

| Formulation curing agents | | |
|---|---|---|
| | CA1 (wt. %) | CA2 (wt. %) |
| aminoethylaminopropyl-3-methoxy-silane | 2.0% | 2.7% |
| Trimethyl terminated polydimethylsiloxane having a viscosity of 12,500 mPa · s at 25° C. | 38.3% | 51.0% |
| AEROSIL ® R974 treated silica | 6.7% | 9.0% |
| Dimethyl tin dineodecanoate (DMTDN) | 0.4% | 0.5% |
| ADHESION PROMOTER | 17.5% | 23.3% |
| 1,6-bis (trimethoxysilyl)hexane | 2.7% | 3.6% |
| Methyl trimethoxy silane | 1.4% | 10.0% |
| trimethoxy end-capped polydimethylsiloxane DP of 550 +/− 10% | 30.9% | 0.0% |

Preparation of the Curing Agent

Aerosil® R 974 used in the curing agent composition is a hydrophobic fumed silica post-treated with dimethyl-dichloro-silane from Evonik Industries. Specific surface area is 200 m²/g according to technical datasheet.

It was determined that a preferable order of addition for the curing agent ingredients was as follows:
siloxane polymer(s)
particulate filler
Adhesion promoter
   Aminoethyl-aminopropyl-trimethoxy silane (distilled)
   Methyl trimethoxy silane
   1,6-bis (trimethoxysilyl) hexane
   DMTDN, followed by a degassing at −500 mBar (−50 kPa)

The curing agent was generally prepared using a Hauschield mixer model DAC 400.1 FVZ, although alternatively planetary mixers could have been utilised.

The inventors have found that this order of addition ensured optimal homogeneity The following Table identifies the combinations used for each Example and provides the respective Volume Resistivity results for each Example. It is to be noted that each example is > than $2 \times 10^{15}$ Ohm·cm TABLE 3c

| | Ex1 | Ex2 | Ex3 | Ex4 | Ex5 | Ex6 | Ex7 |
|---|---|---|---|---|---|---|---|
| Ratio base to curing agent in mass | 3.8:1 | 4.3:1 | 5.1:1 | 5.1:1 | 5.1:1 | 5.1:1 | 6:1 |
| Type of curing agent | CA1 | CA1 | CA1 | CA1 | CA1 | CA1 | CA2 |
| Wt. % FIBER in final adhesive | 0.00 | 10.04 | 20.86 | 20.86 | 20.86 | 20.86 | 0 |
| Wt. % CaCO₃ in the adhesive | 5 | 3.92 | 3.45 | 3.45 | 3.45 | 3.45 | 0 |
| Volume Resistivity ($\times 10^{15}$ Ohm · cm) | 5.1 | 3.2 | 10 | 6.8 | 6.0 | 2.4 | 6.4 |

1) Best results at equivalent fibre content are obtained with Enfil® SH and Rockforce® MS603-Roxul® 1000, which both feature fibre length in the region of 100-150 microns.
2) The comparison (at equivalent dosage) of Enfil® SH and CoatForce® CF50 suggests that the presence of either CaO/MgO or $Al_2O_3$ (or both) has a detrimental effect on the resistivity.

3) comparison of CoatForce® CF50 and Rockforce® MS615-Roxul® 1000 (similar length of fibres, same $Al_2O_3$ content) suggest that the higher level of CaO/MgO has a detrimental effect on the resistivity Durable Adhesion:
Durability of the Protective Coating The viability in practice of an adhesive requires the material to provide durable adhesion. A way to model this is to perform one or more accelerated weathering tests. For the present disclosure 'durable adhesion' means that the adhesive, once cast on a substrate and cured is able to withstand three weeks weathering test without showing more than 50% adhesive failure in the last step (step 3 below). (method 1).

Alternatively (method 2) the durability of adhesion can be assessed using adhesion durability test pieces (as described in method 2 here below). This method provides also mechanical properties of the adhesive, which is an advantage. Method 2 is time consuming as it stipulates 30 days of cure, whereas method 1 allows the discarding of bad (poorly performing) adhesive after one or two weeks of ageing.

Method 1

Adhesive failure (AF) refers to the situation when the coating detaches cleanly (peels off) from the substrate. Cohesive failure (CF) is observed when the coating itself breaks without detaching from the substrate (for example, steel plate). In some cases, a mixed failure mode may be observed; that is some areas peel-off (i.e. AF) while some remain covered with coating (i.e. CF). In such cases, the portions of surface displaying CF (% CF) and AF (% AF) behaviour have been determined. The total of % CF+% AF=100%.

The sequence of adhesion tests defining durability (i.e. three weeks weathering test) is herewith described and executed in the following order on physically the same specimen. When several specimens are being tested (replication) at least 75% of them are required pass. Should the specimen fail Step 1 or step 2 the experiment is stopped because the adhesion of the material is deemed inadequate.

Step 1: One-week Room Temperature (RT) (RT is 20 to 25° C.) and about 50% relative humidity. Necessary is 100% Cohesive failure Step 2. One week Room Temperature (RT) (RT is 20 to 25° C.) and full immersion in water, followed by 24 hours drying at RT and about 50% relative humidity. Necessary is 100% Cohesive failure Step 3. One week High Temperature (this is between 45 and 55° C.) and full immersion in water, followed by 24 hours drying at RT and about 50% relative humidity. Necessary is at least 50% Cohesive failure Fresh mixes of base+cure agents at the ratio specified in table 3c were applied across an area of about 6×4 cm on stainless steel test substrates, forming a layer of +/−6 mm thickness. The composition was then left to cure for 7 days at room temperature (RT). Subsequently, a 0.5 cm undercut as close as possible to the steel plate was made. The cured coating was then manually pulled and the type of failure was recorded (Step 1).

A suitable material should withstand the entire sequence of 3 adhesion tests.

Method 2

An adhesion durability test piece (also referred to as a "type H test piece") was prepared by packing an admixture prepared by mixing separately stored base and curing agent compositions between two aluminum 4×5 cm plates. The dimensions of the H-pieces were in accordance of EOTA-ETAG 002 (May 2012) document (p 32). Om some instances Dow Chemical commercial OS1200 primer were applied prior to producing the H-pieces. The H-pieces were allowed to cure for 30+/−4 days. The adhesion durability test pieces were evaluated by measuring both tensile stress necessary to break the piece and elongation at break, following the methodology described in the EOTA-ETAG 002 (May 2012) document. In addition, the failure mode was evaluated by visual observation. More specifically, the percentage of the surface that corresponded to cohesive failure (% CF) was assessed. When the entire surface of the silicone rubber was subject to cohesive failure, the CF rate was assumed as 100%. When peeling was observed on the entire surface, the CF rate was 0%.

Accelerated ageing tests were performed in the following manner: H-pieces were cured for 7 days at RT and 50% RH. The cured H-pieces were then stored under water at 45° C. for seven days and then allowed to recover for 2 days before mechanical testing.

Adhesion was deemed sufficient when the H-bars cured for 30+/−4 days exhibited at least 90% CF and the specimens subjected to accelerated ageing exhibited at least 50% CF.

Adhesion Method 1

TABLE 4

| base | Ex1 | Ex8 |
|---|---|---|
| curing agent | CA1 | CA2 |
| Ratio base to curing ageing (mass) | 3.8:1 | 6:1 |
| 7 Days (D) at room temperature (RT) | 100% CF | 100% CF |
| 7 D RT + 7 D water at 23° C. | 100% CF | 100% CF |
| 7 D RT + 7 D water at 23° C. + 7 D water at 45° C. | 100% CF | 100% CF |

Adhesion Method 2

TABLE 5

| Base 3.8 parts by mass | Ex1 | |
|---|---|---|
| curing agent 1 part by mass | CA1 | |
| Primer 1200 OS | No | Y |
| Ratio base to curing agent (mass) | 3.8:1 | 3.8:1 |
| H-pieces Aluminum (alu)/alu 33 D RT | | |
| Break comment | 90% CF | 90% CF |
| Tensile at break (MPa) | 0.23 | 0.28 |
| Elongation at break (%) | 26.00 | 25.50 |
| Ageing test H-pieces Aluminum (alu)/alu 7 D cure + 7 days water 45° C. | | |
| Break comment | 100% CF | 83% CF |
| Tensile at break (MPa) | 0.21 | 0.18 |
| Elongation at break (%) | 26.00 | 25.00 |

Tensile at break measurements and elongation at break measurements were carried out in accordance with ASTM D412-98a.

One concludes that the inventive material combines volume resistivity of above $2.0 \times 10^{15}$ Ohm·cm and durable adhesion because the specimen showed 100% CF (e.g. above 90% CF) after 33 Days of cure and the specimens subject of accelerated ageing exhibit at least 90% CF (e.g. above 50% CF). The specimen also passed Method 1 test criteria.

What is claimed is:
1. A silicone elastomer composition comprising:
(a) a polydiorganosiloxane having at least two —OH or hydrolysable groups per molecule;
(b) a cross-linker which will cross-link polydiorganosiloxane (a);

(c) a filler component comprising;
(i) a maximum of 25% by weight of the composition of calcium carbonate and/or silica, and
(ii) one or more fibrous fillers selected from the group consisting of mineral fibers, bulk fibers, refractory fibers, basalt fibers, and mixtures thereof;
(d) a condensation curing catalyst; and optionally
(e) one or more additives;

which upon cure provides a silicone elastomer having a volume resistivity which is $\geq 2 \times 10^{15}$ Ω·cm;

wherein component (c)(ii) comprises one or more ceramic or refractive fibres with fibre lengths of from 100-150 microns, and a CaO/MgO content of less than 30% by weight of the total weight of component (c)(ii); and wherein component (c)(ii) is present in an amount of from 15 to 40% by weight of the composition.

2. The silicone elastomer composition in accordance with claim 1, wherein component (c)(i) comprises precipitated or ground calcium carbonate which, in each case, has a BET specific surface area of >100 m²/g, and/or comprises fumed hydrophobic silica.

3. The silicone elastomer composition in accordance with claim 1, wherein component (c)(ii) comprises one or more fibrous fillers selected from the group consisting of fibers composed of one or more alkali metal oxides, alkali-earths metal oxides, aluminium oxides, iron oxides, and mixtures thereof.

4. The silicone elastomer composition in accordance with claim 1, wherein component (c)(ii) comprises one or more fibrous fillers which consist of predominantly $SiO_2$, transition metals oxides, oxides of the alkali, and alkali-earths elements.

5. The silicone elastomer composition in accordance with claim 1, wherein component (c)(i) has been treated by a treating agent selected from the group consisting of fatty acids, fatty acid esters, organosilanes, organosiloxanes, organosilazanes, short chain siloxane diols, and combinations thereof, to render the filler(s) hydrophobic.

6. The silicone elastomer composition in accordance with claim 1, wherein component (c) is present in an amount of from 10 to 50% by weight of the composition.

7. The silicone elastomer composition in accordance with claim 1, wherein component (c)(i) is present in an amount of from about 5 to 15% by weight of the composition, and wherein component (c)(ii) is present in an amount of from of from 15 to 30% by weight, of the composition.

8. The silicone elastomer composition in accordance with claim 1, wherein the composition is stored in at least two-parts prior to use.

9. The silicone elastomer composition in accordance with claim 8, wherein:
a first part is a base composition comprising component (a), component (c) and filler treating agent; and
a second part is a curing agent.

10. A silicone elastomer, obtainable by or obtained by curing the silicone elastomer composition in accordance with claim 1, the silicone elastomer having a volume resistivity which is $\geq 2 \times 10^{15}$ Ω·cm.

11. A sealant and/or an adhesive comprising or formed from the silicone elastomer in accordance with claim 10.

12. A method of preparing a silicone elastomer from the silicone elastomer composition in accordance with claim 1, the method comprising curing the silicone elastomer composition.

13. The method in accordance with claim 12, wherein component (c) is treated with a filler treating agent in situ.

14. The method in accordance with claim 12, wherein the composition is stored in at least two-parts prior to use.

* * * * *